UNITED STATES PATENT OFFICE.

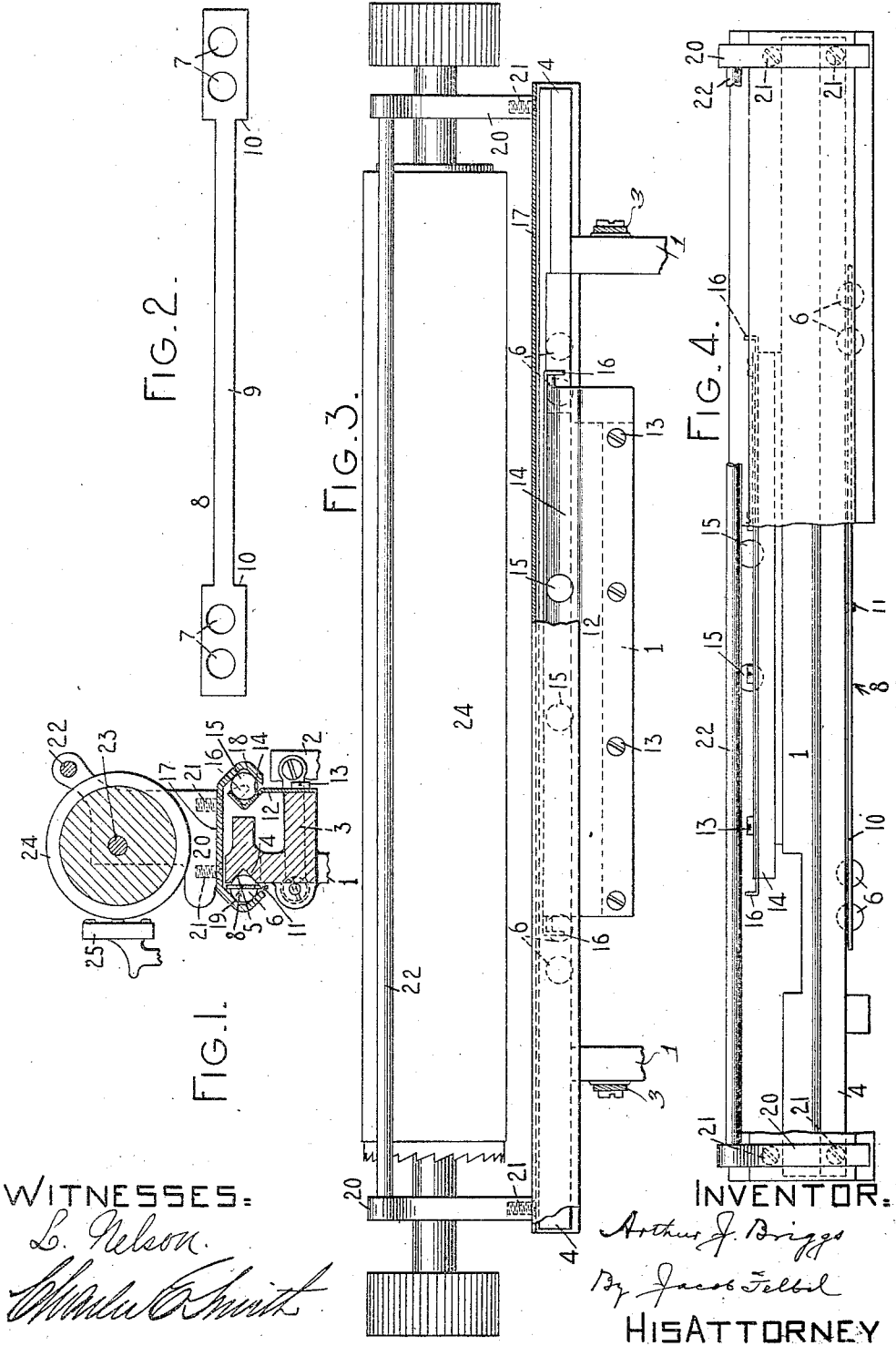

ARTHUR J. BRIGGS, OF SYRACUSE, NEW YORK, ASSIGNOR TO REMINGTON TYPEWRITER COMPANY, OF ILION, NEW YORK, A CORPORATION OF NEW YORK.

TYPE-WRITING MACHINE.

1,132,300.

Specification of Letters Patent. Patented Mar. 16, 1915.

Application filed August 4, 1913. Serial No. 782,859.

*To all whom it may concern:*

Be it known that I, ARTHUR J. BRIGGS, a citizen of the United States, and resident of Syracuse, in the county of Onondaga and State of New York, have invented certain new and useful Improvements in Type-Writing Machines, of which the following is a specification.

My invention relates to typewriting machines and more particularly to means for supporting the carriage for movement from side to side of the machine.

The main object of my invention is to provide simple and efficient means for mounting and supporting the carriage on roller bearings so as to automatically compensate for any unevenness in the bearings, or for grit that may work its way into the bearings and so as to automatically take up and compensate for any wear on the parts.

To the above and other ends which will hereinafter appear, my invention consists in the features of construction, arrangements of parts and combinations of devices set forth in the following specification and particularly pointed out in the appended claims.

In the accompanying drawings wherein like reference characters indicate corresponding parts in the various views, Figure 1 is a fragmentary vertical sectional view of a carriage and the means for supporting the same. Fig. 2 is a detail face view of a separator for the anti-friction rollers. Fig. 3 is a detail rear view of the construction shown in Fig. 1 with parts broken away. Fig. 4 is a plan view of the same with parts broken away and parts omitted.

In the present instance I have shown my invention embodied in a front-strike typewriting machine and have only illustrated so much of said machine as may be necessary to arrive at an understanding of the invention. It should be understood, however, that the invention may be embodied in various styles of typewriting machines and that the construction may be modified accordingly.

A shiftable supporting member 1 is connected to the frame 2 of the machine by parallel links 3, one of which is represented in Fig. 1. The shiftable part or frame 1 may receive its case shifting movement by any suitable means, such for example, as those disclosed in my pending application, Sr. No. 791,734, filed Sept. 25, 1913. The member 1 is provided with a guide rail 4 grooved in its forward face as at 5 to form a ball race for anti-friction balls or rollers 6. The length of this rail corresponds substantially to the length of the carriage, as indicated in Fig. 3. In the present instance I have shown two sets of anti-friction balls or rollers 6, one set being arranged near each end of the rail 4 when the carriage is centrally disposed as represented in Fig. 3. These anti-friction rollers are received in openings 7 in a roller separator 8. This separator is enlarged at its ends and contracted at the center portion thereof, as indicated at 9, to form shoulders or abutments 10 where the enlarged portions join the contracted center portion of the separator. A centrally disposed pin 11 projects forwardly beneath the contracted portion 9 of the separator and into the space between the shoulders 10. This pin limits the movement of the separator with the anti-friction rollers along the track 4 and assures a proper positioning of the separator and the anti-friction balls controlled thereby with reference to the carriage.

The shiftable member 1 has a resilient plate 12 secured thereto by screws 13. This plate is grooved throughout its length, as indicated at 14, to provide a race-way in which one or more anti-friction balls or rollers 15 are received. From an inspection of Fig. 3 it will be observed that the plate 12 is centrally disposed and comparatively short, it being about one-half the length of the rail 4. Each end of the plate is provided with a finger 16 which is bent rearwardly into the path of the anti-friction balls 15 to prevent a displacement of the balls 15 from the raceway 14. The resilient plate 12 exerts a pressure rearwardly against the balls 15 for purposes which will hereinafter more clearly appear.

The carriage comprises a substantially horizontally disposed supporting member 17 which is substantially C-shaped in cross section and opens downwardly and extends over and around the bearing grooves in the tracks 4 and 14. This member is formed from a single piece of sheet metal with longitudinally extending guide rails, tracks, grooves or race-ways 18 and 19 therein, the race-way 18 being disposed oppositely the groove 14 in the plate 12 and the groove 19 being disposed opposite the groove 5 in the rail 4, as shown in Fig. 1.

End plates 20 extend upwardly from the supporting member 17 and are secured thereto by headed screws 21 which extend through openings in the supporting member and are received at their threaded ends in tapped openings in the lower edges of the end plates 20. A tie rod 22 connects the end plates, and a platen shaft 23 is received in bearing openings in the end plates. This shaft supports a platen 24 against the front face of which the type bars 25 are adapted to strike. It will be seen that the entire carriage proper consists of the supporting member 17, the end plates 20 and the tie rod 22.

The resilient plate 12 normally exerts a rearward pressure on the anti-friction rollers 15 tending to move the guide rail or way 14 away from the rail 4. This tends to force the supporting member 17 to the rear and exert a rearward pressure against the anti-friction balls or rollers 6, the pressure of the balls 6 being resisted by the relatively fixed rail 4. It will be understood therefore that the resiliency of the plate 12 is exerted to automatically compensate for any unevenness or irregularity in the roller bearing support for the carriage and to compensate for any grit that may happen to work its way into the bearings. However, it will be seen that there is but little opportunity for grit or dust to gain access to the bearings, inasmuch as they are well protected by the supporting member 17 which with the rail 4 and the plate 12 almost completely surround the roller bearings.

It will be understood that the rail 4 forming a part of the shifting frame 1 and carrying the plate 12 constitutes in effect a shift rail by which the carriage may receive a case shifting movement. It will be understood, moreover, that by the use of the spring supported track or rail 14 it is unnecessary to maintain a nice adjustment between the roller bearings in order to render them efficient to effectively support and guide the carriage without undue freedom and without undue binding between different parts of the bearing and that the resiliency of the plate 12 enables the bearings to automatically take up and compensate for any wear that may take place thereon.

Various changes may be made without departing from the spirit and scope of my invention.

What I claim as new and desire to secure by Letters Patent, is:—

1. Means for supporting the carriage of a typewriting machine, said means comprising guide rails one of which is carried by a resilient plate, and anti-friction rollers interposed between one of said rails and the rail which is carried by said resilient plate.

2. Means for supporting the carriage of a typewriting machine, said means comprising oppositely grooved guide rails one of which is a part of a resilient plate, and anti-friction rollers interposed between one of said rails and the guide rail which is part of said resilient plate.

3. Means for supporting the carriage of a typewriting machine, said means comprising four guide rails one of which forms part of a resilient plate, and anti-friction rollers co-acting with said rails.

4. Means for supporting the carriage of a typewriting machine, said means comprising four guide rails one of which is received between two of the other rails and is formed from a resilient plate, and anti-friction rollers co-acting with said guide rails.

5. In a typewriting machine, the combination of a platen; and supporting means therefor comprising a member which is substantially C-shaped in cross section, said member forming opposite guide rails, opposite guide rails received in said C-shaped member, one of the latter rails being kept in its working position by spring pressure, and anti-friction rollers interposed between the rails of said C-shaped member and the rails which are received in said member.

6. In a typewriting machine, the combination of a platen; and supporting means therefor comprising a plurality of grooved guide rails, one of which is a relatively short centrally disposed rail in the nature of a grooved resilient plate, one or more anti-friction rollers contained in the groove of said resilient plate and which are substantially centered therein when the platen is centered, and a plurality of anti-friction rollers between the other companion guide rails and disposed nearer the ends of the platen when the platen is centered.

7. In a typewriting machine, the combination of a platen; and supporting means therefor comprising a member which is substantially C-shaped in cross section, said member forming oppositely disposed guide rails, oppositely disposed guide rails received in said C-shaped member and one of which is in the nature of a resilient guide plate, and anti-friction rollers interposed between said rails.

8. In a typewriting machine, the combination of a platen; and supporting means therefor comprising a single-piece member which is substantially C-shaped in cross-section, said member forming oppositely grooved guide rails, oppositely grooved guide rails received in said C-shaped member and one of which is in the nature of a resilient grooved guide plate, and anti-friction rollers contained within the grooves in said rails.

9. In a typewriting machine, the combination of a platen; and supporting means therefor comprising a member which is substantially C-shaped in cross-section, said member being carried by or forming part of the carriage and forming oppositely disposed grooved guide rails, and oppositely grooved guide rails carried by the frame of the machine and received in said C-shaped member, one of said last mentioned guide rails being in the nature of a resilient grooved plate flexed away from the other of the rails received in the C-shaped member, and anti-friction rollers contained within the grooves in said rails.

10. In a typewriting machine, the combination of a platen; and suporting means therefor comprising a single-piece member which is substantially C-shaped in cross-section and is carried by or forms part of the carriage and forms oppositely disposed grooved guide rails, the said C-shaped member being arranged with its closed side uppermost, oppositely grooved guide rails carried by the frame of the machine, and anti-friction rollers between the rails on the carriage and those on the frame of the machine, one of the latter rails being kept in its working position by spring pressure.

11. In a typewriting machine, the combination of a platen; and supporting means therefor comprising a member which is substantially C-shaped in cross section and is formed with oppositely grooved rails, a shiftable grooved rail received in said C-shaped member, a grooved rail formed of a resilient plate fixed to said shiftable rail and received in said C-shaped member, and anti-friction rollers contained within the grooves of said rails.

12. In a typewriting machine, the combination of a platen; and supporting means therefor comprising a single-piece member which is substantially C-shaped in cross-section and substantially horizontally disposed and formed with oppositely grooved rails, said member being arranged with its closed side uppermost, oppositely grooved rails received in said C-shaped member, one of the latter rails being kept in its working position by spring pressure, means for shiftably supporting said last mentioned rails, and anti-friction rollers interposed between said rails.

13. In a typewriting machine, the combination of a platen; and supporting means therefor comprising a single-piece member which is substantially C-shaped in cross-section and is substantially horizontally disposed and formed with oppositely grooved rails, said member being arranged with its closed side uppermost, oppositely grooved rails received in said C-shaped member, one of said last mentioned rails being in the nature of a grooved resilient plate shorter than the other rails and secured to the other rail which is received in the C-shaped member, said last mentioned rail being shiftably mounted, one or more anti-friction rollers contained in the groove of the resilient plate and substantially centrally disposed therein when the platen is centered, and a plurality of anti-friction rollers in the grooves of the other companion rails and disposed nearer the ends of the platen when the platen is centered.

14. In a typewriting machine, the combination of a platen; and supporting means therefor comprising a member which is substantially C-shaped in cross-section and forms oppositely disposed guide rails, oppositely disposed guide rails received in said C-shaped member, spring means for separating said last mentioned rails, anti-friction rollers interposed between the rails of said C-shaped member and the rails which are received in said member, and parallel links on which the rails received in said C-shaped member are mounted and by which they are guided.

15. In a typewriting machine, the combination of a carriage comprising a substantially horizontally disposed supporting member which is C-shaped in cross section and is formed from a single piece; shiftable supporting rails received in said supporting member, said shiftable rails being relatively movable toward and away from each other; and anti-friction rollers between said supporting member and shiftable rails.

16. In a typewriting machine, the combination of a carriage comprising a substantially horizontally disposed supporting member which is substantially C-shaped in cross section and is formed from a single piece, end plates secured to said supporting member, and a tie rod connecting said end plates; shiftable supporting rails received in said supporting member, said shiftable rails being relatively movable toward and away from each other; and anti-friction rollers between said supporting member and shiftable rails.

17. In a typewriting machine, the combination of a carriage comprising a supporting member which is substantially C-shaped in cross-section and is formed from a single piece; shiftable supporting rails received in said supporting member, one of said shiftable rails being in the nature of a resilient plate; and anti-friction rollers between said supporting member and shiftable rails.

18. In a typewriting machine, the combination of a carriage, and means for supporting said carriage, said carriage supporting means including a resilient grooved plate, and anti-friction rollers received in the groove in said plate, the plate being provided at its ends with fingers which are bent into the path of said anti-friction rollers to prevent the escape of the rollers from the groove in the plate.

Signed at Syracuse, in the county of Onondaga, and State of New York, this 30 day of July A. D. 1913.

ARTHUR J. BRIGGS.

Witnesses:
HERBERT A. CARHART,
D. E. WARING.